*(12)* United States Patent
Street et al.

(10) Patent No.: US 8,573,320 B2
(45) Date of Patent: Nov. 5, 2013

(54) TURF EDGER FOR CUTTING A CLEAN EDGE ALONG A BOUNDARY BETWEEN A TURF SURFACE AND A SOFT NON-TURF SURFACE

(75) Inventors: Benjamin A. Street, Northfield, MN (US); Cal N. Kosieracki, St. Louis Park, MN (US); Miguel A. Pizano, Eden Prairie, MN (US); Daniel M. Treu, Inver Grove Heights, MN (US); Joseph P. Thelen, Shakopee, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 13/345,685

(22) Filed: Jan. 7, 2012

(65) Prior Publication Data

US 2013/0175062 A1    Jul. 11, 2013

(51) Int. Cl.
*A01D 15/00*   (2006.01)
*A01D 21/00*   (2006.01)
*A01D 23/00*   (2006.01)
*A01D 27/00*   (2006.01)
*A01D 34/00*   (2006.01)

(52) U.S. Cl.
USPC ............................................................ 172/15

(58) Field of Classification Search
USPC ................. 172/17, 19, 13, 42, 14, 15, 18, 20; 56/12.7, 13.7
See application file for complete search history.

(56) References Cited

U.S. PATENT DOCUMENTS

| | | | | | |
|---|---|---|---|---|---|
| 2,909,021 | A | * | 10/1959 | McLane | 56/16.9 |
| 3,490,213 | A | * | 1/1970 | Pinto | 56/16.9 |
| 3,695,713 | A | * | 10/1972 | Rothi et al. | 299/10 |
| 4,982,800 | A | * | 1/1991 | Shields | 172/19 |
| 5,009,270 | A | * | 4/1991 | Vangsgard | 172/42 |
| 5,690,178 | A | * | 11/1997 | Zehrung et al. | 172/19 |
| 6,125,943 | A | * | 10/2000 | Valois | 172/15 |
| 6,351,930 | B1 | * | 3/2002 | Byrne | 56/12.7 |
| 6,691,792 | B2 | * | 2/2004 | Keane | 172/14 |
| 6,962,209 | B2 | * | 11/2005 | Isaman et al. | 172/19 |
| 7,096,970 | B1 | * | 8/2006 | Porter et al. | 172/42 |
| 7,798,242 | B2 | * | 9/2010 | Bednar | 172/19 |

\* cited by examiner

*Primary Examiner* — Árpád Fábián-Kovács
(74) *Attorney, Agent, or Firm* — James W. Miller

(57) ABSTRACT

A turf edger is attached to a traction unit in the form of a self-propelled turf grooming or working vehicle. The turf edger has a narrow U-shaped edging blade carried on an edger frame. The edging blade oscillates to cut and free a strip of material along a boundary between a turf surface and a non-turf surface. When this strip of material is brushed away, a clean edge is provided along the boundary without the need for any manual hoeing. Side walls of the edging blade at least partially nest around a ground engaging roller on the edger frame to more easily cut horizontal grass runners in the turf surface. The edger frame is selectively movable between a lowered edging position and a raised transport position by the operator. Limited ground following action is provided for the edger frame when the edger frame is in the edging position.

19 Claims, 7 Drawing Sheets

TURF EDGER FOR CUTTING A CLEAN EDGE ALONG A BOUNDARY BETWEEN A TURF SURFACE AND A SOFT NON-TURF SURFACE

TECHNICAL FIELD

This invention relates to turf grooming equipment and more specifically to a turf edger for use on surfaces comprising a turf surface and an adjoining non-turf surface that is soft enough to be cut, such as on a baseball field where various turf surfaces, namely the grassy portions in the infield and the outfield, adjoin various dirt surfaces, namely the skinned areas in the infield and the warning track.

BACKGROUND OF THE INVENTION

Baseball fields are well known and have various boundaries where dirt surfaces abut or adjoin against turf surfaces. For example, the dirt in the infield is bounded along its inside boundary, i.e. the boundary that is closest to home plate, by the outermost edge of the infield grass. Similarly, the dirt in the infield is bounded along its outside boundary, i.e. the boundary that is furthest from home plate, by the innermost edge of the outfield grass. In a similar fashion, the outermost edge of the outfield grass is bounded along a boundary formed by the dirt of the warning track. These are all examples of boundaries in which a turf surface adjoins a relatively soft surface, such as but not limited to dirt, which can be cut or sliced through, as opposed to adjoining a hard surface, such as a sidewalk, which cannot be cut or sliced through without damaging the hard surface.

One problem with boundaries such as those described above in a baseball field is the ability of the grass in the turf surface to overgrow the desired boundary and to intrude onto and into the dirt surface. For example, Bermuda grass has many desirable properties that make it a grass that is commonly used on baseball fields. However, Bermuda grass propagates and spreads by sending out above ground runners or stolons and below ground rhizomes (basically underground runners) from which new growth will sprout. This new growth of Bermuda grass, which accounts for the desirable feature that Bermuda grass can repair or heal itself through new growth, inevitably causes grass to begin to appear on top of or to sprout up through the adjoining dirt surfaces of a baseball field.

However, the overgrowth of the Bermuda grass does not propagate itself over the dirt surfaces in a uniform fashion, but does so in an irregular and unpredictable manner. Thus, the boundary between the turf surface and the dirt surface soon takes on a jagged, irregular and unkempt look where initially there had been a clean edge demarking the two surfaces. This is unsightly and unattractive to many people and therefore undesirable. And, if left unchecked, the overgrowth of the Bermuda grass could eventually dramatically shorten the width of the dirt surfaces in the baseball field. This is undesirable from both a player safety standpoint and from a baseball field standards standpoint, namely the skinned or dirt areas of the infield should have certain prescribed dimensions.

Another problem that arises on baseball fields is a build up of dirt along the boundary between the turf and dirt surfaces. This can be corrected to some extent by brushing the dirt build up away from the boundary and back onto the dirt surface. However, such brushing eventually becomes ineffective and the dirt build up eventually forms a raised ridge or lip along the boundary. This raised lip poses safety hazards to the players, e.g. an infielder can trip on the lip as the infielder runs to the outfield to catch a short fly ball. If such lips are formed by the dirt build up, they must be removed to ensure the field is safe to play on.

Thus, the need to restore a clean edge to the boundaries between the turf and dirt surfaces of a baseball field, namely to remove the overgrowth of the grass or to remove any raised lips formed by dirt build up, has been recognized in the art. One way of doing this is to exclusively use hand tools, such as spades, to edge along the boundary entirely by hand. This is obviously highly labor intensive given the long distances that these boundaries have on a baseball field. For example, the boundary between the outermost edge of the outfield and the warning track is itself hundreds of feet long. It would take workers many hours of work to properly edge that one boundary alone. The costs involved in using hand labor alone for such edging are prohibitive.

In an effort to cut down the amount of labor required, some edging has been done on baseball fields using a common walk behind lawn edger of the type used to edge along a sidewalk or the like. Such a lawn edger has a blade that rotates in a vertical cutting plane about a substantially horizontal axis. When used on a baseball field, the blade of this type of lawn edger cuts a single vertical slit into the turf surface along the intended boundary between the turf and dirt surfaces. This slit serves to separate the grass overgrowth that has intruded into the dirt surface from the grass that should properly lie along the edge of the boundary.

However, because of the basic nature of Bermuda grass, the overgrowth is rather firmly anchored to the dirt surface by the runners, stolons and rhizomes that form the mechanism by which the overgrowth was propagated. Thus, workers still need to follow along the slit created by the lawn edger to cut through and free the overgrowth from the dirt. This is commonly done using a hand tool known as a hula hoe. While this method of edging using a powered lawn edger is less labor intensive than one relying solely on hand labor, it still involves a fair amount of such hand labor due to the manual hoeing step involved.

Accordingly, there is a need in the art to provide a turf edger that can effectively and productively cut a clean edge along boundaries between turf and soft non-turf surfaces, such as the dirt surfaces found on baseball fields, in a way that significantly reduces or eliminates the amount of hand labor that was previously required. This invention provides a turf edger that solves that need.

SUMMARY OF THE INVENTION

One aspect of this invention comprises a turf edger for use in combination with a self-propelled traction unit for cutting a clean edge along a boundary on the ground between a turf surface and a soft non-turf surface. The turf edger comprises an edger frame carried by the traction unit. An upwardly facing, substantially U-shaped edging blade formed by a bottom wall and a pair or spaced side walls is provided on the edger frame. The bottom wall and side walls have front cutting edges. The edging blade is pivotally mounted on the edger frame for pivoting about a substantially horizontal pivot axis. A drive system is carried on the edger frame for oscillating the arm and the edging blade back and forth in an angular arc relative to the frame. Repeating cycles of the oscillating motion of the edging blade cuts parallel slits into the turf and non-turf surfaces and the bottom wall cuts through subsurface root growth between the slits to free a strip of material along the boundary comprised of portions of the turf surface and portions of the non-turf surface. A clean edge is provided between the turf and non-turf surfaces after the strip of material that has been freed by the oscillating motion of the edger blade is cleared away from the boundary.

Another aspect of this invention relates to an attachment for use in combination with a self-propelled traction unit for cutting a clean edge along a boundary on the ground between a turf surface and a soft non-turf surface. The attachment comprises a support carried by the traction unit. A turf edger is provided which comprises an edger mount having a releasable connection to the support to be able to mount and dismount the turf edger from the traction unit. An edger frame has a pivotal connection to the edger mount to allow the edger frame to pivot or rotate about a first horizontal pivot axis to move the edger frame between a lowered, operative edging position and a raised, inoperative transport position. The edger frame includes a handle for moving the edger frame between the edging and transport positions. A locking mechanism is cooperable between the edger mount and the handle providing releasable detent connections between the edger mount and the handle for locking the edger frame in the edging and transport positions. A roller carried on the edger frame supports the edger frame for rolling on the turf surface in the edging position thereof. The edger frame is configured for pivoting motion relative to the traction unit while in the edging position to permit the roller and the edger frame to follow ground contours. A substantially U-shaped edging blade is carried on the edger frame for oscillating movement about a second horizontal pivot axis.

Yet another aspect of this invention relates to a turf surface cutter for use on a self-propelled turf grooming or working vehicle that carries an operator thereon. The cutter comprises a frame carried by the vehicle. A U-shaped blade is carried on the frame for oscillating movement about a horizontal pivot. The blade cuts and frees a substantially continuous strip of material from the ground during operation of the blade as the vehicle traverses over the ground with at least one side of the strip comprising a portion of the turf surface. The frame is selectively movable relative to the vehicle between a lowered edging position and a raised transport position by the operator as the operator is carried on the vehicle.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
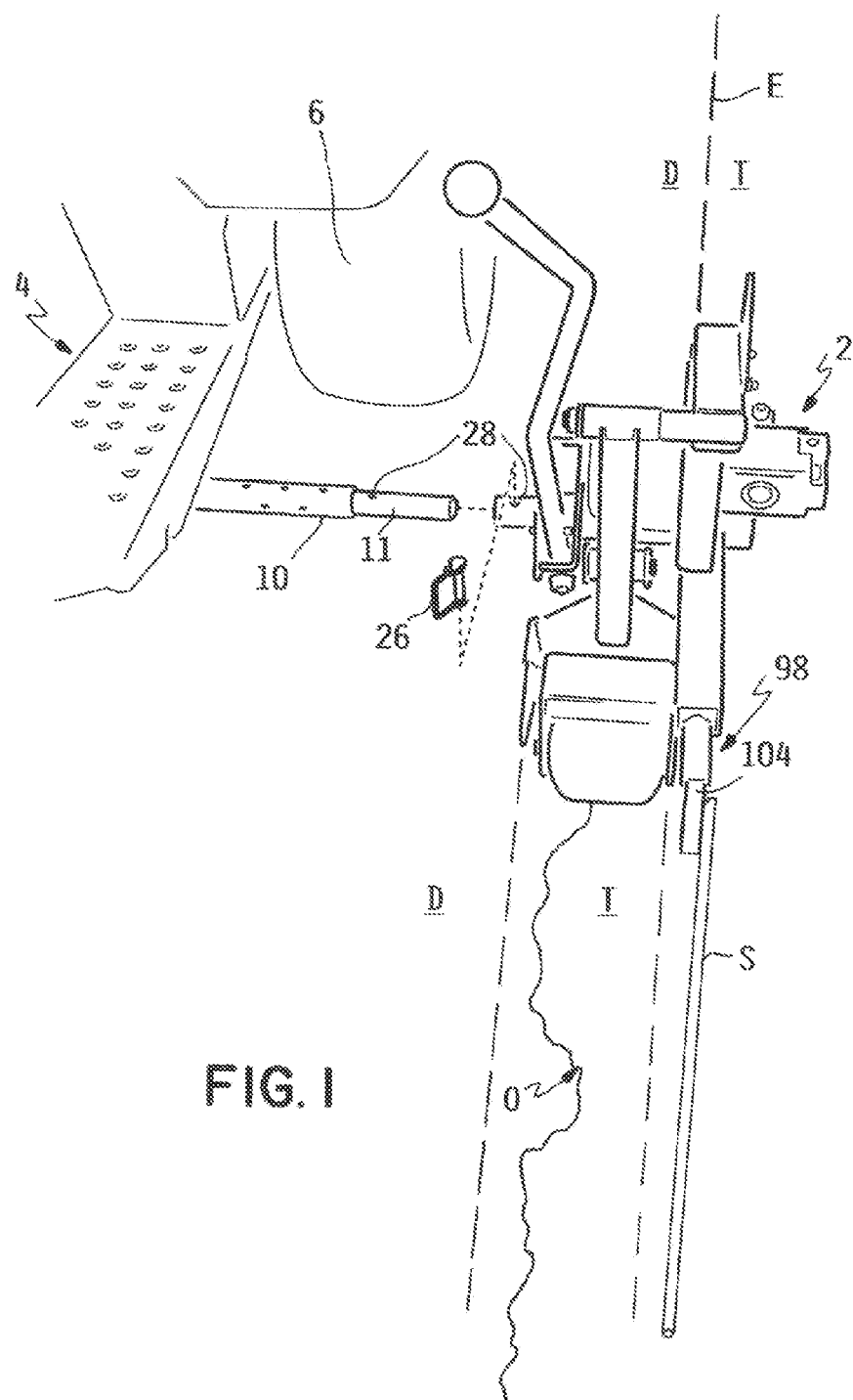
FIG. 1 is a perspective view of the turf edger of this invention, particularly illustrating the turf edger exploded away from an edger support that detachably connects the turf edger to a self-propelled traction frame.

One embodiment of a turf edger according to this invention is illustrated generally as 2 in the drawings. As shown in FIG. 1, edger 2 will be carried by a traction unit 4 having one or more ground engaging wheels 6. One or more wheels 6 are driven from a power source (not shown), such as but not limited to an internal combustion engine, which is carried on traction unit 4. Thus, traction unit 4 self-propels itself over the ground and carries edger 2 with it as it does so.

Traction unit 4 preferably comprises any outdoor power equipment unit used for or in conjunction with ground or turf grooming or working operations. For example, traction unit 4 can be any of the Sand Pro® line of grooming vehicles or of the Workman® line of utility vehicles manufactured and sold by The Toro Company, the assignee of this invention. Traction unit 4 preferably is in the form of a vehicle, such as the aforementioned Sand Pro® or Workman® vehicle, which carries an operator thereon to enhance the ease of use of edger 2 and for greater productivity. However, traction unit 4 can also be a unit, such as a wide area walk mower, which is operated by an operator who walks on the ground behind traction unit 4 during operation of traction unit 4.

Figure 2:
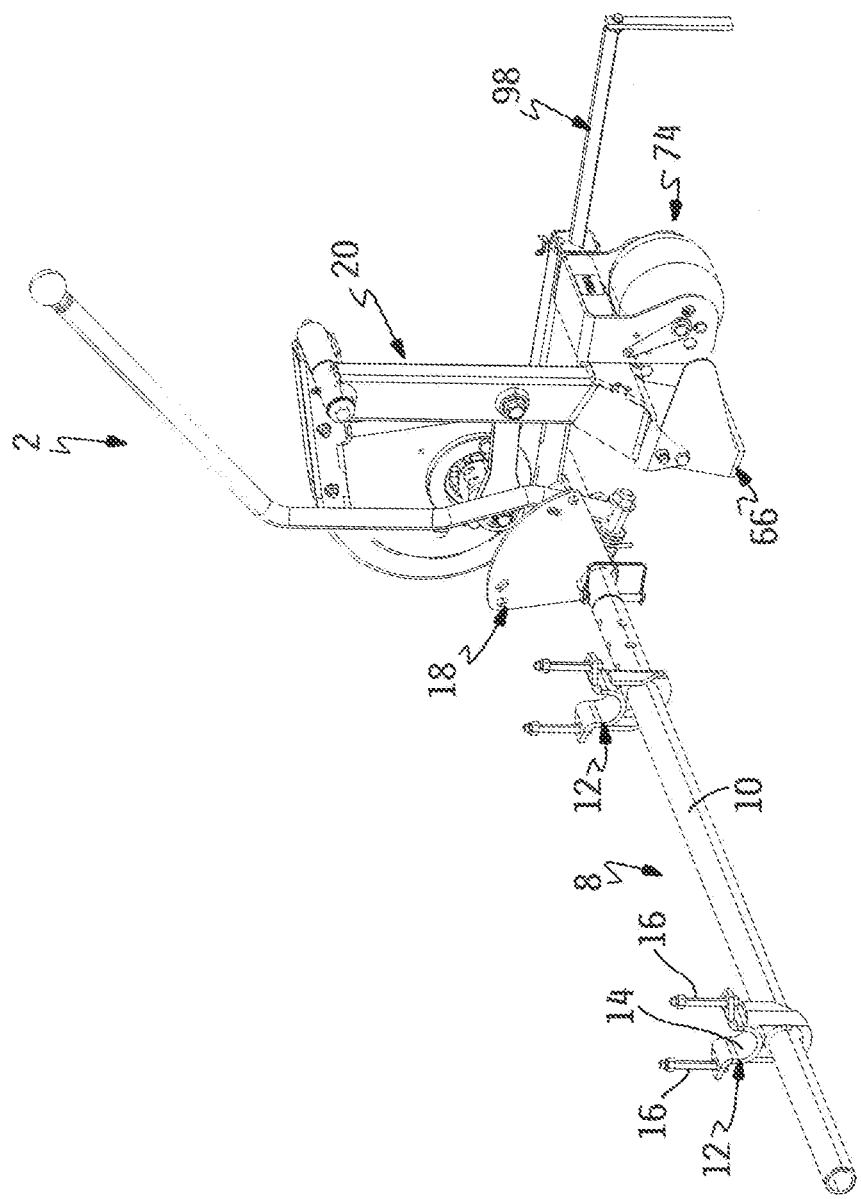
FIG. 2 is a perspective view of the turf edger of FIG. 1, particularly illustrating the turf edger connected to the edger support but with other portions of the traction frame not being shown for the sake of clarity.
Figure 3:
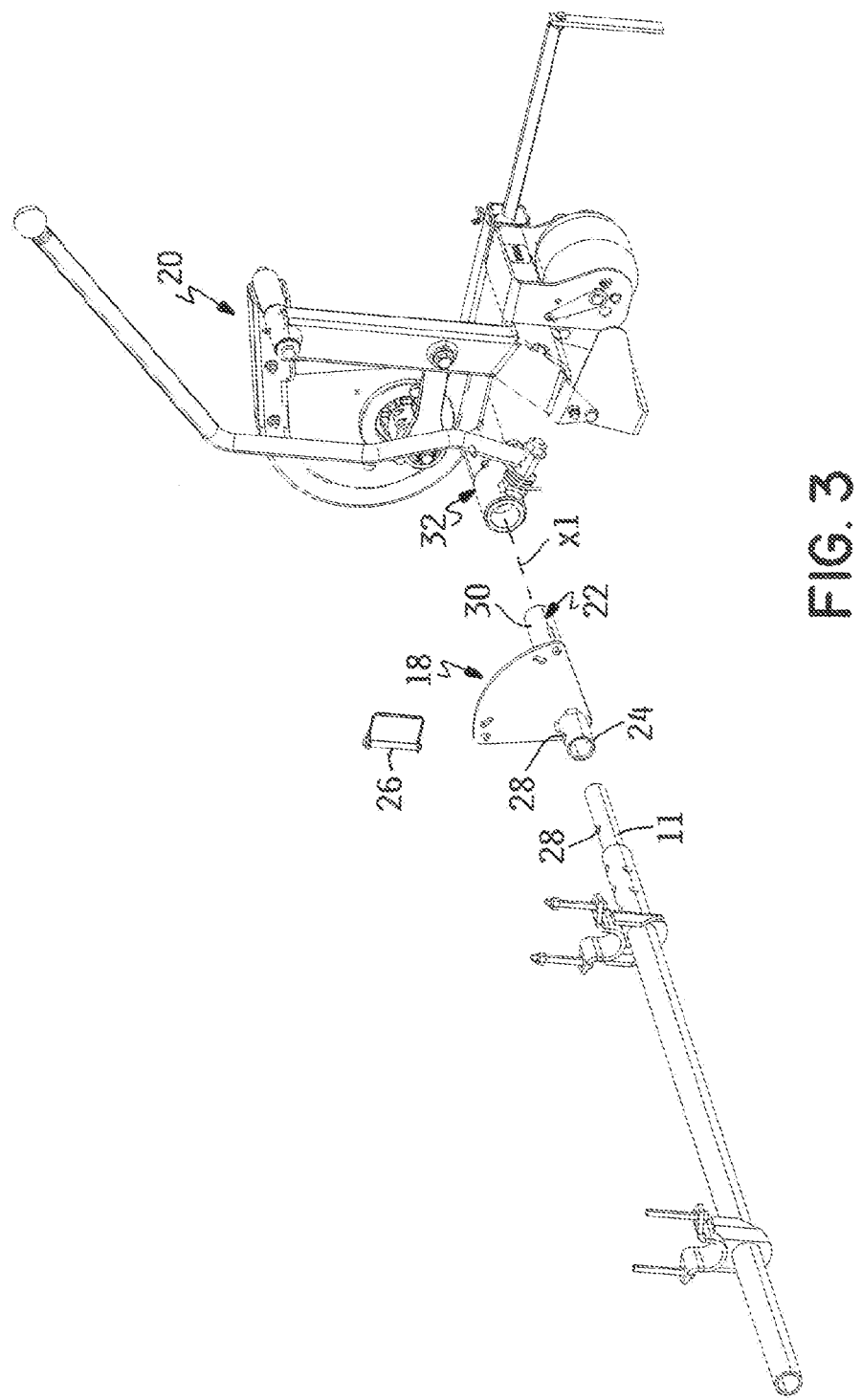
FIG. 3 is a perspective view similar to FIG. 2 of the turf edger of FIG. 1, particularly illustrating the edger support, an edger hitch pin, an edger mount, and a pivotal edger frame in exploded form.

As shown in FIG. 1, traction unit 4 has an edger support 8 comprising an elongated, laterally extending support tube 10 located on the underside of traction unit 4. Preferably, tube 10 locates edger 2 slightly outboard of the lateral wheelbase of traction unit 4 in a position in which edger 2 can be easily seen by the operator during operation of traction unit 4. Tube 10 can be integrally formed with or fixed to traction unit 4, as by welding, to form a non-removable part of traction unit 4. Alternatively, as shown in FIGS. 2 and 3, tube 10 can be sold together with edger 2 as an attachment kit for use on a preexisting traction unit. In this case, tube 10 is provided with one or more clamps 12 which each have an upwardly facing U-shaped saddle 14 that is clamped against a piece of traction unit 4 when various bolts 16 are tightened on traction unit 4.

As most clearly shown in FIG. 3, edger 2 comprises two primary parts. The first part is an edger mount 18 that cooperates with tube 10 to removably affix edger 2 to tube 10 and thus to traction frame 4. The second part is an edger frame 20 that is pivotally carried on mount 18 and which carries the working or edging components of edger 2.

Figure 4:
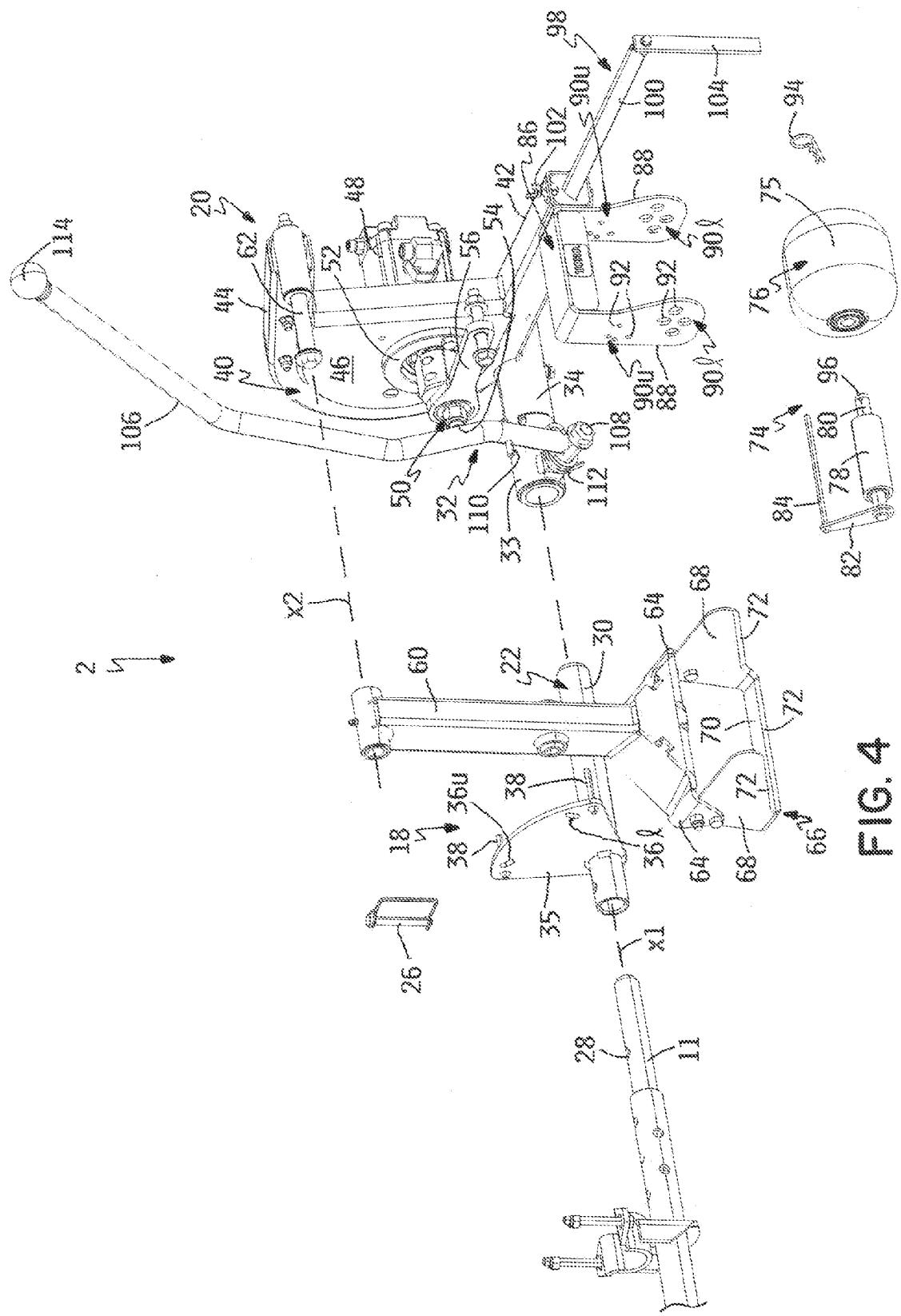
FIG. 4 is an enlarged perspective view of a portion of FIG. 3, particularly illustrating various structure that is carried on the pivotal edger frame in a partially exploded form including an oscillating arm carrying a U-shaped cutter blade and further including various portions of a roller assembly.

Mount 18 of edger 2 basically comprises a simple cylindrical hub 22. A first end 24 of hub 22 has a telescopic connection with a reduced diameter end 11 of tube 10 to allow edger 2 to be installed on tube 10 by slipping first end 24 of hub 22 over reduced diameter end 11 of tube 10. When so installed as shown in FIG. 2, a suitable hitch pin 26 can be dropped down through aligned holes 28 in first end 24 of hub 22 and in reduced diameter end 11 of tube 10 to non-rotatably couple but releasably affix mount 18 to tube 10. In other words, once hub 22 is affixed to tube 10, hub 22 does not rotate around the axis of tube 10 but remains stationary relative thereto. Referring now to FIGS. 3 and 4, a second opposite end 30 of hub 22 forms a horizontal pivot for edger frame 20 of edger 2 as denoted by the horizontal pivot axis x1.

The releasable telescopic interconnection between mount 18 and tube 10 allows edger 2 to be quickly and easily installed on traction unit 4 when an edging operation is to be conducted. However, once that edging operation is concluded, edger 2 can be quickly and easily removed from traction unit 4 so that edger 2 need not be carried on traction unit 4 when it is not needed.

Hub 22 also has a locking plate 35 welded thereto. Locking plate 35 has a lower detent 36*l* and an upper detent 36*u* formed therein. Handle stops 38 are located on locking plate 35 adjacent detents 36 and protrude from one side of locking plate 35. The function of locking plate 35, detents 36 and handle stops 38 will be described in more detail hereafter.

Edger frame 20 of edger 2 includes a hollow sleeve 32 that telescopes over second end 30 of hub 22. Sleeve 32 is made in two parts, namely an inner sleeve section 33 and an outer sleeve section 34, that are stacked side-by-side against one another on second end 30 of hub 22. Sleeve sections 33 and 34 are free to rotate in limited arcs around second end 30 of hub 22 to pivotally couple edger frame 20 to mount 18 for movement between a lowered, operative edging position and a raised, inoperative transport position in a manner that will be described in more detail hereafter.

Figure 6:
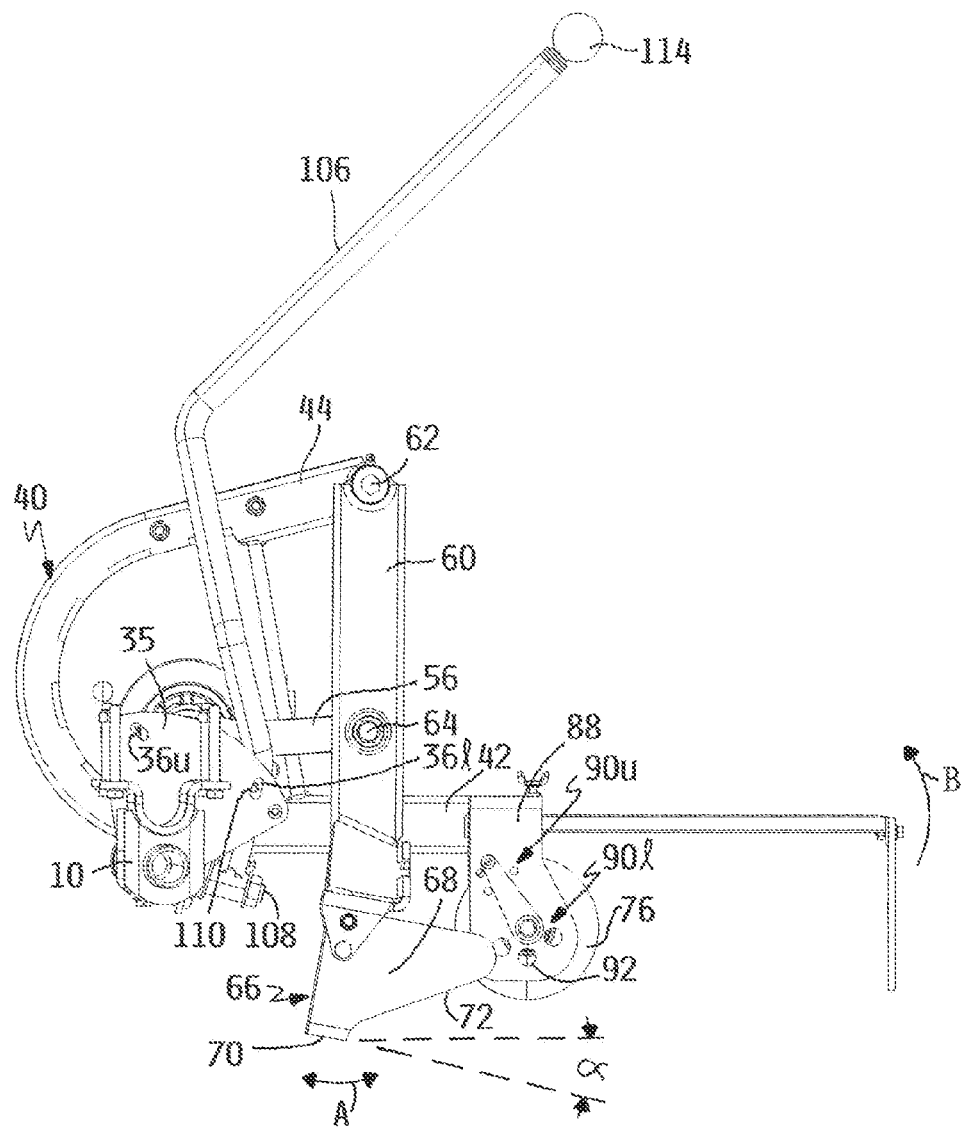
FIG. 6 is a side elevational view of the turf edger as shown in FIG. 2.
Figure 7:
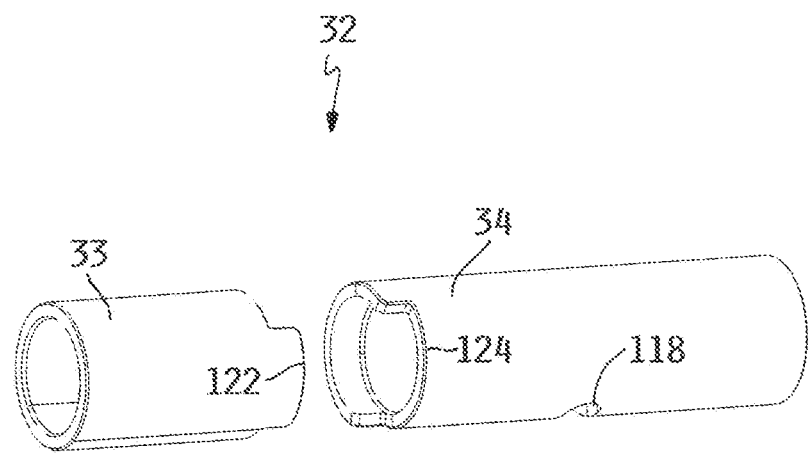
FIG. 7 is a perspective view of a portion of the edger frame, particularly illustrating a tongue and groove interconnection between various sections of a sleeve that is part of the edger frame.

Referring now to FIGS. 4 and 6, edger frame 20 further includes a forwardly facing, generally C-shaped bracket 40 that is welded to the top of outer sleeve section 34. Bracket 40 has a lower leg 42 that extends further forwardly than an upper leg 44 of bracket 40. The interior of the C-shape of bracket 40 is substantially closed off by a mounting plate 46.

As best shown in FIG. 4, a hydraulic drive motor 48 is mounted substantially horizontally on the laterally outboard side of mounting plate 46. Pressurized hydraulic fluid will be provided to motor 48 through hydraulic supply and return hoses (not shown) that are connected to a hydraulic pump (not shown) located on traction unit 4. A drive shaft 50 of motor 48 extends substantially horizontally inwardly through an opening 52 in mounting plate 46 such that a free end 54 of drive shaft 50 terminates laterally inboard of mounting plate 46. A forwardly extending crank arm 56 is mounted to free end 54 of drive shaft 50 in an eccentric manner such that crank arm 56 oscillates forwardly and rearwardly during each rotation of drive shaft 50.

A substantially vertical arm 60 is supported on upper leg 44 of bracket 40 by an upper horizontal pivot 62 for pivoting about a substantially horizontal pivot axis x2. As best shown in FIG. 6, the front end of crank arm 56 is pivotally connected to arm 60 by a second horizontal pivot 64 that is located below upper horizontal pivot 62. The lower end of arm 60 includes a pair of laterally spaced mounting ears 64. A substantially U-shaped edging blade 66 is bolted to mounting ears 64 of arm 60 by various bolts 68.

As best shown in FIG. 4, edging blade 66 includes a pair of side walls 68 and a bottom wall 70 which are preferably formed as a single piece. Bottom wall 70 and the upwardly inclined front edges of side walls 68 comprise sharpened cutting edges 72 of edging blade 66. When motor 48 is put into operation and drive shaft 50 is rotated, crank arm 56 will oscillate arm 60, and thus also oscillate edging blade 66, back and forth in the arc identified by the arrows A in FIG. 6. As edging blade 66 is so oscillated, cutting edges 72 on side walls 68 of edging blade 66 cut a pair or parallel slits into a turf surface while cutting edge 72 on bottom wall 70 of edging blade 66 cuts substantially horizontally in a subsurface manner through the soil between the slits. The action of edging blade 66 serves to cut and free from the ground a continuous but narrow strip of turf. The width of the strip of turf so cut and freed is determined by the distance between side walls 68 of edging blade 66.

Referring now to FIGS. 4 and 6, edger frame 20 further includes a roller assembly 74 mounted to the inboard side of the front end of lower leg 42 of bracket 40. Roller assembly 74 includes a narrow roller 76 that is between approximately 4 and 8 inches wide and preferably approximately 5½ inches wide. Roller 76 is journalled by a bushing 78 for rotation about a substantially horizontal axle 80. One end of axle 80 includes an upwardly and rearwardly extending link 82. A substantially horizontal rod forms a scraper 84 that extends to one side of link 82 and is substantially parallel to axle 80 of roller 76.

Link 82 is dimensioned relative to the outer diameter of roller 76 such that scraper 84 will overlie the flat central portion 75 of roller 76. Scraper 84 will be radially positioned relative to central portion 75 of roller 76 to be capable of scraping dirt and debris off central portion 75 of roller 76 during rotation of roller 76 without substantially inhibiting rotation of roller 76. Thus, scraper 84 will either just lightly contact the outer diameter of central portion 75 or lie slightly radially outwardly of the outer diameter of central portion 75. As should be evident, roller 76 rests atop the ground during operation of edger 2 to control the cutting depth of bottom wall 70 of edging blade 66.

Roller assembly 74 is mounted to lower leg 42 of bracket 40 by a downwardly facing, U-shaped cradle 86. Cradle 86 has spaced side walls 88. Each side wall 88 contains two arrays 90 of mounting holes 92. Arrays 90 comprise a lower array 90*l* having mounting holes 92 of a larger diameter that are sized to receive axle 80 of roller 76 and an upper array 90*u* having mounting holes of a smaller diameter that are sized to receive scraper 84.

Each hole 92 in arrays 90 is located at a different vertical height from the other holes in the same array to establish a number of different possible heights of roller 76 relative to lower leg 42 of bracket 40. Holes 92 in arrays 90 are in the same pattern and have the same vertical spacing from one another after compensating for the difference in diameter between holes 92 in the different arrays 90*l* and 90*u*. Axle 80 of roller 76 will be located in any desired hole 92 in lower array 90*l* with scraper 84 being located in the corresponding hole 92 in upper array 90*u*.

FIG. 6 shows axle 80 of roller 76 located in the uppermost hole 92 in lower array 90*l* with scraper 84 being similarly located in the uppermost hole 92 in upper array 90*u*. In this position, roller 76 is closest to lower leg 42 of bracket 40 such that edging blade 66 is cutting at its maximum cutting depth. Moving axle 80 and scraper 84 downwardly into any of the other holes 92 in arrays 90 will move roller 76 further downwardly away from lower leg 42 of bracket 40. This lifts or raises edging blade 66 relative to the ground to decrease the cutting depth of edging blade 66. This happens in increments corresponding to the incremental vertical distance changes between the centers of the various holes 92 in arrays 90. Roller assembly 74 is held in place within cradle 86 by a hair pin connector 94 that passes through a hole 96 in one end of axle 80 after axle 80 is first inserted through a selected hole 92 in lower array 90*l* and has passed completely through both side walls 88 of cradle 86.

Referring now to FIGS. 4 and 6, edger frame 20 also includes an L-shaped alignment guide 98 mounted to the front of lower leg 42 of bracket 40. Guide 98 comprises a forwardly extending upper arm 100 that is telescopically received in the interior of lower leg 42 of bracket 40 to allow the forwardly protruding length of upper arm 100 to be adjusted. A thumb screw 102 can be tightened to lock upper arm 100 of guide 98 in any desired adjusted position. Guide 98 also includes a downwardly extending front arm 104 mounted on the front of upper arm 100. Front arm 104 is made of a flexible material and is long enough to extend down into contact with the ground and can thus bend or deflect as it contacts the ground during operation of traction unit 4 and edger 2. The purpose of guide 98 is to allow the operator to precisely position edger 2 relative to a boundary that is to be edged by edger 2.

A locking handle 106 is pivotally carried on a short, forwardly extending pivot pin 108 carried on inner section 33 of sleeve 32 of edger frame 20. Handle 106 has an inboard side that faces locking plate 35 on mount 18 with the inboard side having a locking pin 110 designed to enter into or engage with either detent 36 in locking plate 35. A torsion spring 112 biases handle 106 inwardly towards locking plate 35 such that pin 110 is biased towards engagement with detents 36 in locking plate 35. Handle 106 is long enough and is configured such that a knob 114 on the upper end of handle 106 is located close enough to the operator of edger 2 such that the operator can grip knob 114 to manipulate handle 106. Handle 106 is rotatable about two axes, namely the generally fore-and-aft axis of pivot pin 108 as well as the lateral axis x1 formed by second end 30 of hub 22.

The operator uses handle 106 to selectively move edger frame 20 into either of its edging and transport positions and to lock edger frame 20 in the selected position. FIGS. 2-6 show edger frame 20 in its edging position in which it has been lowered down relative to mount 18 until roller 76 engages the ground and edging blade 66 is ready to cut. In the edging position, pin 110 on handle 106 is biased into lower detent 36l in locking plate 35 and handle 106 has been abutted with the lowermost stop 38 on locking plate 35.

To lift or raise edger frame 20 to its transport position, the operator can grip knob 114 on handle 106 and first pivot handle 106 laterally outwardly on pivot pin 108 to move handle 106 away from locking plate 35 against the bias of torsion spring 112. This laterally outward motion disengages or pulls pin 110 out of lower detent 36l on locking plate 35. After handle 106 has been so disengaged from locking plate 35, the operator can then rotate handle 106 about the pivot formed by second end 30 of hub 22 to pivot edger frame 20 upwardly about the pivot axis x1 as indicated by the arrow B in FIG. 6. The operator continues this motion until handle 106 hits or abuts against stop 38 that is adjacent to upper detent 36u which positions pin 110 in alignment with upper detent 36u. If the operator simply releases handle 106 at that point, the bias of torsion spring 112 takes over and causes pin 110 to enter into upper detent 36u to lock or hold edger frame 20 in an upwardly inclined transport position (not shown). Roller 76, guide 98 and edging blade 66 have all been lifted well clear of the ground in the transport position. This permits the operator to propel traction unit 4 at a faster speed during transport from one edging location to another than the speed at which traction unit 4 is operated during an edging operation.

Figure 5:
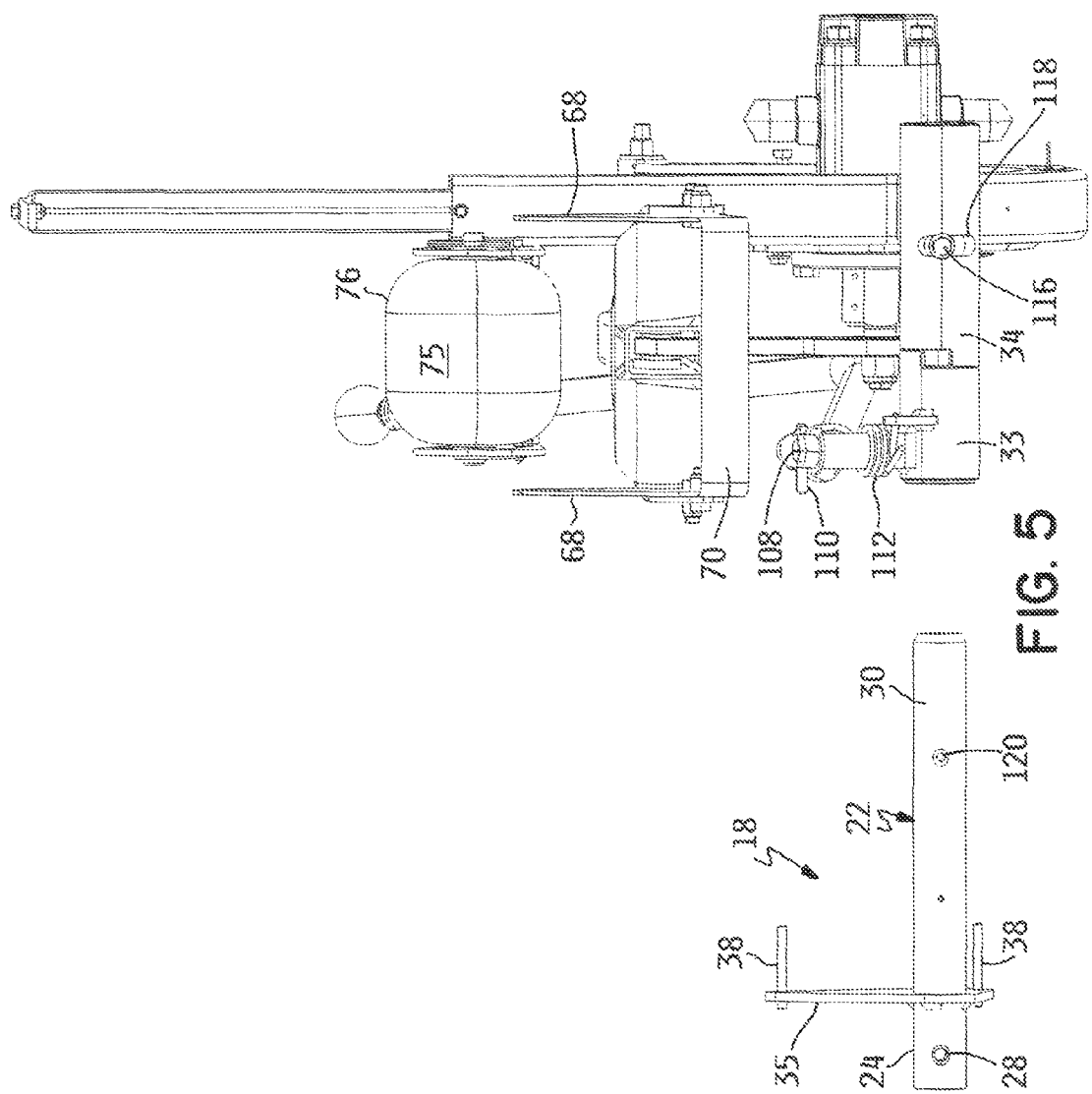
FIG. 5 is an enlarged bottom plan view of a portion of FIG. 3.

Referring now to FIG. 5, edger frame 20 of edger 2 is held on the pivot formed by second end 30 of hub 22 of mount 18 by a bolt 116 which passes upwardly through an arcuate slot 118 in the bottom of outer section 34 of sleeve 32 of edger frame 20. The shank of bolt 116 is threaded into a threaded hole 120 provided therefor on second end 30 of hub 22. However, the head of bolt 116 does not clamp outer sleeve section 34 tightly against second end 30 of hub 22 but permits outer sleeve section 34 to pivot or rotate freely around second end 30. Rather, bolt 116 when installed in slot 118 simply bears or abuts against the sides of slot 118 to prevent laterally outward motion of outer sleeve section 34 that might in the absence of bolt 116 disconnect outer sleeve section 34 from second end 30 of hub 22. Bolt 116 also indirectly retains inner sleeve section 33 on hub 22 since inner sleeve section 33 is slipped onto hub 22 before outer sleeve section 34. Thus, inner sleeve section 33 is therefore sandwiched between locking plate 75 and outer sleeve section 33 after outer sleeve section 33 is slipped onto hub 22 and bolt 116 is passed upwardly through slot 118 to enter threaded hole 120.

Slot 118 is sufficiently elongated in its angular extent that the amount of angular motion needed to pivot edger frame 20 between its edging and transport positions is accommodated by the length of slot 118. In fact, slot 118 is somewhat longer than is needed for the purpose of just providing the angular motion required for movement of edger frame 20 between the edging and transport positions. When edger frame 20 is in its substantially horizontal edging position with roller 76 riding atop the ground as shown in FIG. 6, bolt 116 is not located at one end of slot 118 but is in an intermediate position between the ends of slot 118 as best shown in FIG. 5.

In addition, inner and outer sleeve sections 33 and 34 are keyed to one another for joint rotation by a tongue and groove connection. Referring to FIG. 8, one end of inner sleeve section 33 has an axially extending tongue 122 that is received in an axially extending slot or groove 124 on the abutting end of outer sleeve section 34. However, tongue 122 has an angular extent that is somewhat less than the angular extent of groove 124 such that there is some lost motion distance on each side of tongue 122 when edger frame 20 is in its substantially horizontal edging position as shown in FIG. 6. In effect, with edger frame 20 oriented as shown in FIG. 6, tongue 122 has an intermediate position between the ends of groove 124 substantially similar to the configuration of bolt 116 relative to slot 118.

The intermediate positioning of bolt 116 relative to slot 118 and of tongue 122 relative to slot 124 permits edger frame 20 to have its own limited ground following action independent of the motion of traction unit 4. Thus, edger frame 20 can follow or adjust to contours of the ground that are not simultaneously felt by traction unit 4 to better maintain the desired cutting depth. For example, if roller 76 hits a bump that is outside of the lateral wheelbase of traction unit 4, which bump is therefore not encountered by wheels 6 of traction unit 4, edger frame 20 of edger 2 can pitch upwardly about pivot axis x1 until the bottom side of groove 124 hits the bottom side of tongue 122 or the back end of slot 118 hits bolt 116, whichever occurs first. In the opposite situation of roller 76 hitting a depression that is not encountered by wheels 6 of traction unit 4, edger frame 20 of edger 2 can pitch downwardly to follow the depression until the top side of groove 124 hits the top side of tongue 122 or the front end of slot 118 hits bolt 116, whichever occurs first. This allows edger frame 20 to independently pitch upwardly or downwardly at least over limited angular arcs to better follow small bumps or depressions that it hits even though traction unit 4 remains level.

Despite the fact that edger frame 20 has independent ground contour following ability and uses a pair of separate sleeve sections 33 and 34 to make up sleeve 32, rotation of handle 106 is still able to lift edger frame 20 into its raised transport position. When the operator rotates or pivots handle 106 in the correct direction, inner sleeve section 33 first rotates independently of outer sleeve section 34 until the lost motion distance between the top side of tongue 122 and the top side of groove 124 is taken up. At this point, outer sleeve section 34 becomes rotatably linked to inner sleeve section 33. Continued rotation of handle 106 in the same direction then causes the top side of tongue 122 to push against the top side of groove 124 to rotate both sleeve sections 33 and 34 together in the same direction. This rotation is allowed to continue until edger frame 20 reaches the raised transport position and handle 106 locks into upper detent 36u. This event occurs before bolt 116 hits the back end of slot 118. In other words, there is enough lost motion distance between the back end of slot 118 and bolt 116 to accommodate the angular pivoting of edger frame 20 between its lowered edging position and its raised transport position.

If independent ground following action is not needed or required for edger frame 20, the use of two sleeve sections 33 and 34 to make up sleeve 32 is not needed. In this case, handle 106 would be carried on a single unitary sleeve 32 in the same manner as it is carried on inner sleeve section 33. An edger 2 having such a configuration would still be operable and offer many of the same advantages as before, but simply would not be able to pitch upwardly and downwardly in an independent fashion from traction unit 4. Any upward and downward pitching would have to come solely from upward and downward pitching of traction unit 4 as wheels 6 on traction unit 4 engage bumps or depressions. Since a primary use of edger 2 is on a baseball field which should be relatively free of bumps and depressions, independent ground following action may not be needed for edger frame 20. Such independent ground following action would be more useful when edger 2 is used on more contoured surfaces, such as those found on golf courses.

As shown in FIGS. 5 and 6, edging blade 66 is somewhat wider than narrow roller 76. For example, edging blade 66 has a width, determined by the lateral distance between side walls 68, in the range from 6 to 10 inches, and preferably a width of about 7¾ inches when roller 76 has a width of approximately 5½ inches. In addition, edging blade 66 is positioned relatively closely behind roller 76 as best shown in FIG. 6. Thus, as edging blade 66 oscillates back and forth, at least the forward portions of the sharpened cutting edges 72 on side walls 68 nest around at least the rear of roller 76.

The Applicants have found that this nesting relationship between edging blade 66 and roller 76 to be desirable. Essentially, roller 76 holds the turf surface down as the forward portions of cutting edges 72 of side walls 68 slice through the turf surface on each side of roller 76 adjacent the rear of roller 76. This allows the cutting edges 72 of side walls 68 to more easily and cleanly slice through the horizontal runners that are normally found in the turf surface than if cutting edges 72 of side walls 68 were disposed in back of roller 76. However, even though side walls 68 are nested at least partially around roller 76, bottom wall 70 of edging blade 66 is always located behind roller 76 during oscillation of edging blade 66.

The ground on a baseball field can become very hard in dry, hot and sunny conditions when the ground is baked by the sun. Thus, the narrow width of edging blade 66, i.e. a width that is preferably equal to or less than about ten inches wide, helps edging blade 66 penetrate such hard ground without requiring excessive amounts of power. Such a narrow edging blade 66 is also preferable when edging a boundary between a turf surface and a dirt surface on a baseball field as the Applicants have found that it keeps the disruption of the dirt surface to an acceptable minimum.

Moreover, bottom wall 70 of edging blade 66 is set or pitched at a nominal, downward digging angle relative to the horizontal, indicated by the angle $\alpha$ in FIG. 6, of approximately −10°. While angle $\alpha$ will vary slightly due to the oscillation of edging blade 66 depending upon where bottom wall 70 is at in each cycle of oscillation (from −7.4° to −13.3°), the angle $\alpha$ will always remain negative (i.e. angled downwardly) and never turn positive due to a short oscillatory stroke (a stroke of about 2 inches). The downwardly angled pitch to bottom wall 70 indicated by angle $\alpha$ further helps edging blade 66 to penetrate even into hard ground.

Returning now to FIG. 1, use of edger 2 is demonstrated for use on a boundary on a baseball field where a turf surface, identified as T, adjoins a soft non-turf surface such as dirt, identified as D. This boundary could be any of numerous boundaries on a baseball field. The turf surface T has overgrown the desired boundary with the overgrowth being indicated by the relatively jagged and uneven line, indentified as O, between the turf surface T and the dirt surface D. Traction unit 4 is being propelled forwardly in the direction of arrow F.

A string S can be set up on the baseball field to help the operator steer traction unit 4. Desirably, string S is set up so that one side wall 68 of edging blade 66 always overlies the turf surface T while the other side wall 68 of edging blade 66 just reaches past the overgrowth at its maximum extent. When traction unit 4 is propelled forwardly in the direction of arrow F and with the operator aligning flexible front arm 104 of guide 98 against string S to help guide traction unit 4, side walls 68 of edging blade 66 will cut slits into both the turf surface T and the dirt surface D while bottom wall 70 of edging blade 66 simultaneously cuts horizontally through any subsurface root growth that is present between the slits.

The two slits cut by side walls 68 are indicated by dotted lines in FIG. 1. The area between the slits represents a narrow strip of material that has been loosened. There is no need for any follow up hand labor or manual hoeing to loosen the overgrowth O. The action of bottom wall 70 of edging blade 66 has already done this.

With the strip of turf surface having been loosened, all that needs to be done is to come back and pull or push the strip of turf surface away from the undisturbed turf surface to remove the overgrowth and to return to a clean edge, identified as E, along the desired boundary. This can be done rather easily with rakes or brushes. In fact, power operated brushes mounted on vehicles, such as Sand Pro® vehicles, are already used on baseball fields for brushing the boundaries between the turf and dirt surfaces on a baseball field. If traction unit 4 makes a return pass with such a power operated brush mounted on traction unit 4 with the brush having been set into motion, the brush will simply brush the loosened strip of material away from the clean edge E as it drives along the loosened strip to expose the clean edge E of the boundary. See the clean edge E in FIG. 1 behind traction unit 4 in which the loosened strip that has been cut has been cleared away so that there is a sharp and straight demarcation between turf surface T and dirt surface D.

The labor savings achieved by edger 2 should be apparent. A time consuming and labor intensive step of prior art methods of edging, namely the manual hoeing needed to cut through subsurface root growth, is eliminated. All the operator needs to do is to propel traction unit 2 along the ground and to keep guide 98 aligned with string S while edging blade 66 is put into operation by powering motor 48. Edging blade 66 easily and quickly edges along the boundary and cuts through subsurface root growth as it does so. It is therefore much less costly to edge the various turf surface/dirt boundaries found on a baseball field using edger 2 than was previously possible in the art. Traction unit 4 provides sufficient traction that edger 2 works properly without having to add weight to traction unit 4 or edger 2.

Various modifications of this invention will be limited to those skilled in the art. For example, hydraulic drive motor 48 could be an electric motor or a power take-off (PTO) shaft from traction unit 4.

In addition while edger 2 is particularly useful on baseball fields as described above, it is not limited for use on such fields. For example, edger 2 can be used on golf courses to edge boundaries along transition areas in desert type golf courses where desert type terrain borders on the turf surfaces of the course, or to edge along the sides of the cart paths of golf courses where the cart paths are formed of soft non-turf surfaces such as sand or dirt. In addition, edger 2 can be used along the boundaries between a grassy turf surface and an adjoining flower bed where the boundary of the flower bed is open to the turf surface and is not formed by a brick or stone wall. Finally, edger 2 need not necessarily be used along a boundary between a turf surface and a non-turf surface, but could be used simply to cut and remove narrow strips of the turf surface, such as when repairing only a small section of a golf green or when cutting a trench in a turf surface.

Thus, the scope of this invention will be apparent to those skilled in the art.

The invention claimed is:

1. A turf edger for use in combination with a self-propelled traction unit for cutting a clean edge along a boundary on the ground between a turf surface and a soft non-turf surface, which comprises:
    (a) an edger frame carried by the traction unit;
    (b) an upwardly facing, substantially U-shaped edging blade formed by a bottom wall and a pair or spaced side walls, wherein the bottom wall and side walls have front cutting edges, and wherein the edging blade is pivotally mounted on the edger frame for pivoting about a substantially horizontal pivot axis; and
    (c) a drive system for oscillating the edging blade back and forth in an angular arc relative to the frame, wherein repeating cycles of the oscillating motion of the edging blade cuts parallel slits into the turf and non-turf surfaces and the bottom wall cuts through subsurface root growth between the slits to free a strip of material along the boundary comprised of portions of the turf surface and portions of the non-turf surface, whereby a clean edge between the turf and non-turf surfaces is provided after the strip of material that has been freed by the oscillating motion of the edger blade is cleared away from the boundary.

2. The turf edger of claim 1, wherein the edger frame is movable relative to the traction unit to move the edger frame between a lowered, operative edging position in which the edging blade contacts the ground and a raised, inoperative transport position in which the edging blade is out of contact with the ground.

3. The turf edger of claim 1, wherein the edger frame includes a handle that is accessible to an operator who is operating the traction unit with the handle being manually movable by the operator for moving the edger frame between the edging and transport positions.

4. The turf edger of claim 3, wherein the edger frame and traction unit have a locking mechanism for locking the edger frame in either the edging or the transport position.

5. The turf edger of claim 4, further including a ground engaging roller on the edger frame, and wherein the edger frame is pivotable relative to the traction unit when the edger frame is locked in the edging position to permit upward and downward pitching motion of the edger frame for ground contour following.

6. The turf edger of claim 1, further including a ground engaging roller on the edger frame.

7. The turf edger of claim 6, wherein at least forward portions of the side walls of the edging blade nest around at least a rear of the roller such that the roller holds down the turf surface as the forward portions of the side walls cut through horizontal rollers in the turf surface adjacent to opposite sides of the roller.

8. The turf edger of claim 7, further including a substantially vertical guide wall located on the edger frame forwardly of the ground engaging roller to allow an operator to steer the traction unit to position the edging blade by aligning the guide wall against an elongated string marking the boundary that is to be edged.

9. The turf edger of claim 8, wherein the vertical guide wall is flexible and is long enough to reach the ground with the flexibility of the vertical guide wall permitting the guide wall to bend as necessary as it contacts the ground.

10. The turf edger of claim 9, wherein the guide wall is adjustably carried on the edger frame to vary how far in advance of the roller the guide wall is positioned.

11. The turf edger of claim 1, wherein the traction frame is a vehicle which carries an operator thereon.

12. The turf edger of claim 11, wherein the edging blade is positioned outside of the lateral wheelbase of the vehicle.

13. The turf edger of claim 1, wherein the edging blade has a width measured by a lateral distance between the side walls that is equal to or less than 10 inches.

14. The turf edger of claim 13, further including a ground engaging roller on the edger frame, wherein the ground engaging roller has a width that is less than the width of the edging blade.

15. The turf edger of claim 1, further including a mount that attaches the edger frame to the traction unit, wherein the mount has a releasable connection to the traction unit to allow the edger frame to be installed on the traction unit when an edging operation is to take place and to be detached from the traction unit when an edging operation is not needed.

16. The turf edger of claim 15, wherein the releasable connection is a telescopic connection between a support tube provided on the traction unit and an edger hub provided on the mount, the edger hub being releasably fastened by a fastener to the support tube after the telescopic connection is made.

17. The turf edger of claim 16, wherein the edger hub provides a substantially horizontal pivot about which the edger frame pivots when the edger frame moves between a lowered edging position and a raised transport position.

18. The turf edger of claim 1, wherein the drive system includes a drive motor carried on the edger frame, the drive motor being powered by a supply system carried on the traction unit.

19. An attachment for use in combination with a self-propelled traction unit for cutting a clean edge along a boundary on the ground between a turf surface and a soft non-turf surface, which comprises:
    (a) a support carried by the traction unit; and
    (b) a turf edger, which comprises:
        (i) an edger mount having a releasable connection to the support to be able to mount and dismount the turf edger from the traction unit;
        (ii) an edger frame having a pivotal connection to the edger mount to allow the edger frame to pivot or rotate about a first horizontal pivot axis to move the edger frame between a lowered, operative edging position and a raised, inoperative transport position, the edger frame including a handle for moving the edger frame between the edging and transport positions;
        (iii) a locking mechanism cooperable between the edger mount and the handle providing releasable detent connections between the edger mount and the handle for locking the edger frame in the edging and transport positions;
        (iv) a roller carried on the edger frame for supporting the edger frame for rolling on the turf surface in the edging position thereof, the edger frame being configured for pivoting motion relative to the traction unit while in the edging position to permit the roller and the edger frame to follow ground contours; and (v) a substantially U-shaped edging blade carried on the edger frame for oscillating movement about a second horizontal pivot axis.

* * * * *

UNITED STATES PATENT AND TRADEMARK OFFICE
CERTIFICATE OF CORRECTION

PATENT NO. : 8,573,320 B2
APPLICATION NO. : 13/345685
DATED : November 5, 2013
INVENTOR(S) : Benjamin A. Street et al.

It is certified that error appears in the above-identified patent and that said Letters Patent is hereby corrected as shown below:

In the Claims

Claim 7, Col. 11, Line 66, change "rollers" to -- runners --.

Signed and Sealed this
Fourteenth Day of January, 2014

Michelle K. Lee
*Deputy Director of the United States Patent and Trademark Office*